United States Patent [19]
Berg et al.

[11] Patent Number: 5,799,255
[45] Date of Patent: Aug. 25, 1998

[54] METHOD FOR CONTROLLING AN ACCESSORY OF A SUBSCRIBER TERMINAL EQUIPMENT AND AN ACCESSORY OF A SUBSCRIBER TERMINAL EQUIPMENT

[75] Inventors: Jukka Berg; Raimo Malila, both of Oulu, Finland

[73] Assignee: Nokia Mobile Phones Ltd., Salo, Finland

[21] Appl. No.: 748,242

[22] Filed: Nov. 12, 1996

[30] Foreign Application Priority Data

Nov. 13, 1995 [FI] Finland .................... 955455

[51] Int. Cl.⁶ .................... H04B 1/38; H04M 1/00
[52] U.S. Cl. .................... 455/551; 455/557; 455/575
[58] Field of Search .................... 455/422, 424, 455/425, 426, 462, 465, 550, 551, 552, 553, 558, 575, 456, 445, 461, 556, 557

[56] References Cited

U.S. PATENT DOCUMENTS

| | | | |
|---|---|---|---|
| 4,989,230 | 1/1991 | Gillig et al. | 455/552 |
| 5,128,925 | 7/1992 | Dornstetter et al. | 370/17 |
| 5,260,988 | 11/1993 | Schellinger et al. | 455/552 |
| 5,404,580 | 4/1995 | Simpson et al. | 455/558 |

FOREIGN PATENT DOCUMENTS

| | | |
|---|---|---|
| 0 398 773 B1 | 11/1990 | European Pat. Off. . |
| 0 586 081 A1 | 3/1994 | European Pat. Off. . |
| 0 641 137 A3 | 3/1995 | European Pat. Off. . |
| 942215 | 11/1995 | Finland . |
| 2282735 | 4/1994 | United Kingdom . |
| 2284727 | 6/1995 | United Kingdom . |
| WO 92/05672 | 4/1992 | WIPO . |

*Primary Examiner*—Nguyen Vo
*Attorney, Agent, or Firm*—Perman & Green, LLP

[57] ABSTRACT

The present invention relates to a method for controlling an accessory of a location data maintaining subscriber terminal equipment (204) of a cellular network and an accessory (214), and which comprises memory (202, 210) for maintaining a specified subscriber identifier differing from the identifier of the subscriber terminal equipment, and circuitry (206) for connecting to the terminal equipment. In order to enable reliable checking of location data, the combination of the terminal equipment and the accessory comprises processor circuitry (200, 204, 210) for determining its location in connection with activation, memory (210) for storing location parameters, processor with memory circuit (200, 210) for checking its location whenever a call is established when the terminal equipment is connected to the accessory, wherein the processor compares the checked location with the stored location data, and obstructs the use of the subscriber identifier during the call in case the location data differ from one another more than the preset threshold value.

16 Claims, 3 Drawing Sheets

METHOD FOR CONTROLLING AN ACCESSORY OF A SUBSCRIBER TERMINAL EQUIPMENT AND AN ACCESSORY OF A SUBSCRIBER TERMINAL EQUIPMENT

FIELD OF THE INVENTION

The invention relates to a method for controlling an accessory of a location data maintaining subscriber terminal equipment of a cellular network, which cellular network comprises one or more base stations in each cell, and which accessory comprises a specified subscriber identifier differing from the identifier of the subscriber terminal equipment, and an accessory of a subscriber terminal equipment realizing the method.

BACKGROUND ART

It is typical in a cellular radio system that each user or equipment has a specified subscriber identifier by which the system identifies the caller. Call charging, for example, can be directed correctly by means of an identifier. Other additional functions can also be carried out by means of the identifier, such as eliminating the use of a stolen equipment.

Subscriber identifiers are specific either for the equipment or for the user. In an equipment-specific solution subscriber data is stored into some memory element in the equipment. In a user-specific solution subscriber data is stored into some separate memory element, such as a memory card. In digital GSM and DCS systems the card allocated for this purpose is called a SIM card. In digital IS-136 system subscriber data is typically stored into an EEPROM memory in a built-in module. The present invention can be applied to all systems where a subscriber identifier is used, regardless of how it has been realized.

EP 586081 discloses a system where an equipment of a cellular radio system comprises two or more means for storing subscriber data. For example, in the solution of the reference cited a GSM terminal equipment can comprise two or more SIM card locations and a desired identifier can be selected for use from the subscriber identifiers of the SIM cards contained in the SIM card locations.

It is also known that the geographical location of a terminal equipment of a cellular system can be determined at each time. Location data in the terminal equipment can be used for various purposes. When required, the user can define his/her location, the location of the terminal equipment making an emergency call can be determined for sending out help or call charging may be dependent on location.

There are various methods for determining the location of the terminal equipment and these methods can also be applied in connection with the present invention.

WO 92/05672 discloses a method where the distance of a terminal equipment from a base station is determined on the basis of propagation delay of a signal transferred between the terminal equipment and the base station of the system. By measuring similarly between the terminal equipment and several different base stations, the location of the terminal equipment can be defined into an area whose dimensions are determined on the basis of measuring accuracy of signal delay.

EP 398773 discloses a method where a terminal equipment receives data from the cellular system on the clocks and location coordinates of the base stations located in the environment of the terminal equipment. After this, the terminal equipment measures time differences of the signals received from the base stations in question and determines its location on the basis of the measured time differences and the data received from the system.

Prior art methods have not been able to solve the location determination problem in semi-permanently installed equipments which are intended to be used in the same location a longer time, but which can be transferred when required without any switching operations. Especially when the cost of the call depends on the location where the call is made from, location determination is very important.

SUMMARY OF THE INVENTION

The object of the present invention is to realize a method and an equipment by means of which controlling of location determination can be realized in such a manner that the problems associated with call charging, for example, can be solved in a reliable manner.

This is achieved with a method shown in the preamble which is characterized by what is disclosed in the characterizing part of claim 1. The control method according to the invention is further characterized by what is disclosed in the characterizing part of claim 2. The control method according to the invention is also characterized by what is disclosed in the characterizing part of claim 11.

The accessory of the subscriber terminal equipment according to the invention is characterized by what is disclosed in the characterizing part of claim 12.

Several advantages are attained with the accessory and method according to the invention. For example, when applying the method according to the invention to an accessory which is placed at home and in which a subscriber terminal equipment is placed, a lower price can be granted for calls made from permanently placed equipments than for call made from mobile equipments. This is based on the fact that by means of the method according to the invention, the location of the equipment can be checked before each call is made and the unchanged status of the location can be established.

BRIEF DESCRIPTION OF THE FIGURES

In the following, the invention will be explained in more detail with reference to the examples of the drawings, in which.

DESCRIPTION OF PREFERRED EMBODIMENTS

Figure 1:
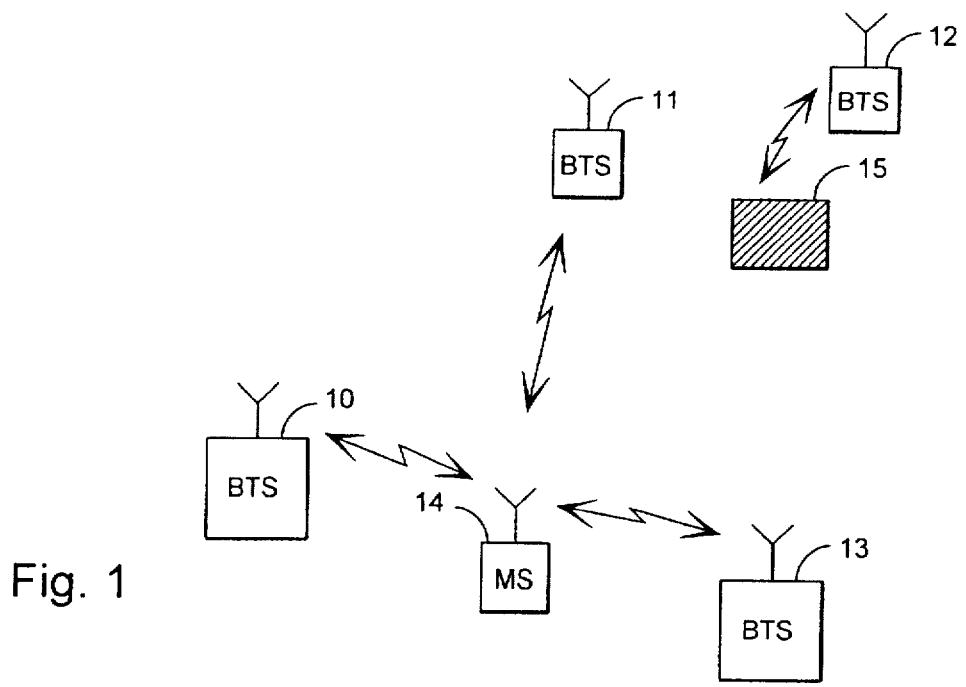
FIG. 1 illustrates a cellular radio system to which the method according to the invention can be applied.

The present invention can be applied to any radio system where a subscriber identifier is used. Such radio systems are for example digital cellular radio systems GSM, DCS and IS-136. The parts of the structure of a typical cellular radio system applicable to the present invention are illustrated in FIG. 1.

The cellular radio system comprises a set of base stations 100 to 104, each of which serves its specified service areas 108 to 112 which in practice are partly overlapping. A subscriber terminal equipment 106 can detect signals 114 to 118 from several base stations, although in practice, the actual call is generally made to the nearest base station that will provide the best connection.

The method according to the invention can be generally applied to several types of accessories of subscriber terminal equipments which have their specified subscriber identifier. The invention can be especially applied to a so-called docking station environment. A docking station is at its simplest a rack of a subscriber terminal equipment, such as a mobile phone rack, which is permanently placed into a specific location and which has a specified subscriber identifier independent of the mobile phone. Operators maintaining cellular radio systems can set a more advantageous price for calls made by means for a docking station fixed in place than for calls made from mobile stations. The docking station can be placed at home, for instance, in which case it can be used for advantageously priced home calls. The unchanged position of the docking station can be ensured by means of the method according to the invention and thus lower rates are justified.

In the first step of the method according to the invention, which is preferably carried out at the installation stage of an accessory, such as a docking station, when the combination of the terminal equipment and the accessory is used for the first time in said installation location, the location of the combination of the terminal equipment and the accessory is measured and stored into a memory register.

Location determination can be carried out in ways known per se as described in the references cited, for example. Localization may take place by using signals from the three nearest base stations. In the exemplary case of FIG. 1, the equipment can measure in the case of the GSM network a so-called Timing Advance (TA) parameter from a signal received from each base station. The distance of the equipment from each base station can be calculated on the basis of these parameters and the location can thus be determined.

The determined location is stored into the memory of the equipment for a subsequent comparison. Parameters associated with location determination, such as the TA parameter of the base station measured in the examples described above, can also be stored into memory.

In the method according to the invention, whenever a call is made with the combination of the terminal equipment and the accessory, the combination checks at the call establishment stage if the location of the combination has changed in comparison to the location determined earlier. A corresponding check is also made when a call is received at the combination, because call charging in the GSM network, for example, may depend on the receiver's location. In this application call establishment refers both to the establishment of a call to be initiated and of a call to be received.

Location checking can be made in connection with call establishment as described above. In the method according to the invention location checking made in connection with call establishment can also be carried out in a simpler way. The above described ways of location determination can be heavy operations for the network, wherefore it is preferable if they can be avoided in connection with calls.

Figure 3A:
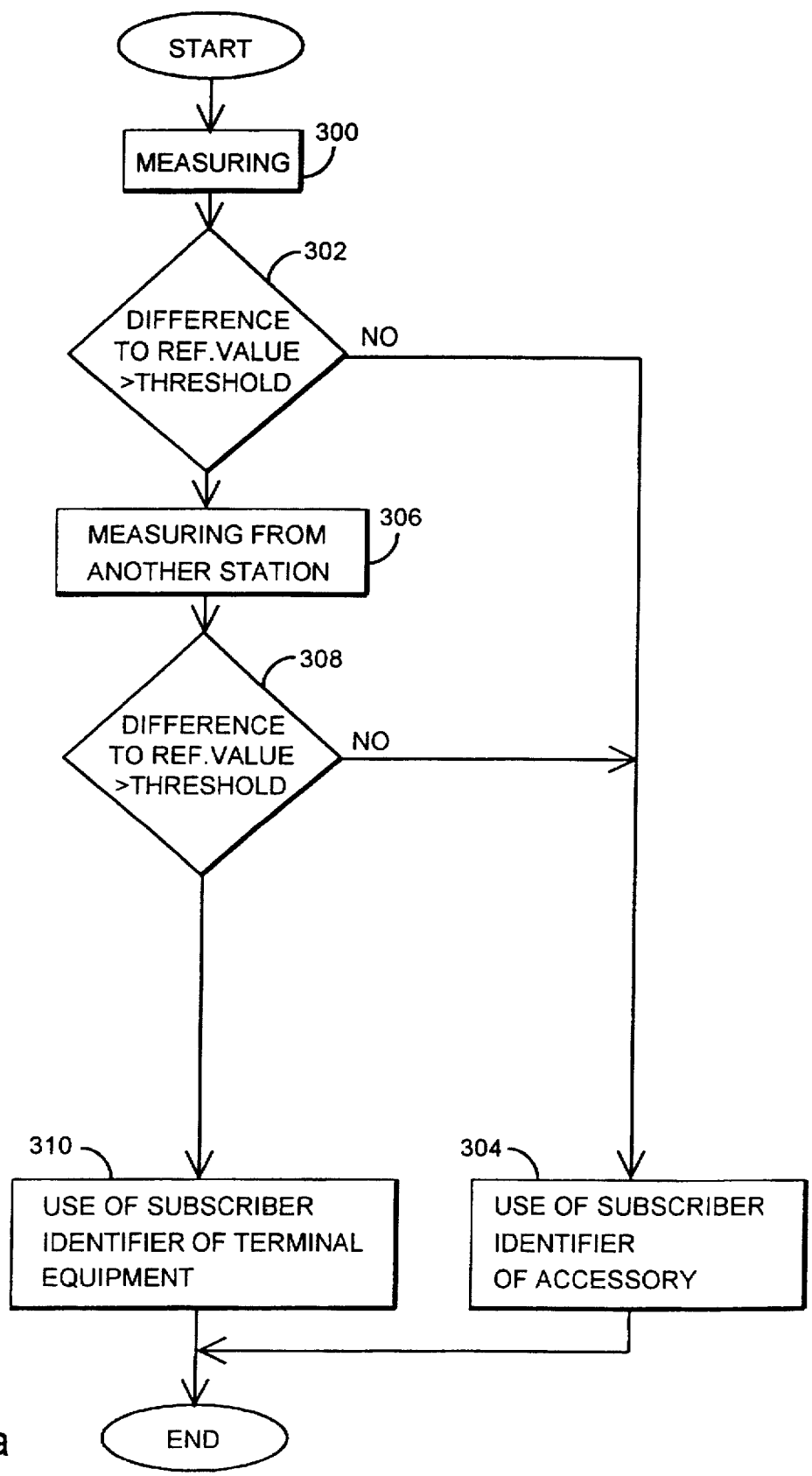
FIGS. 3a and 3b illustrate an example of location checking made in connection with call establishment.
Figure 3B:
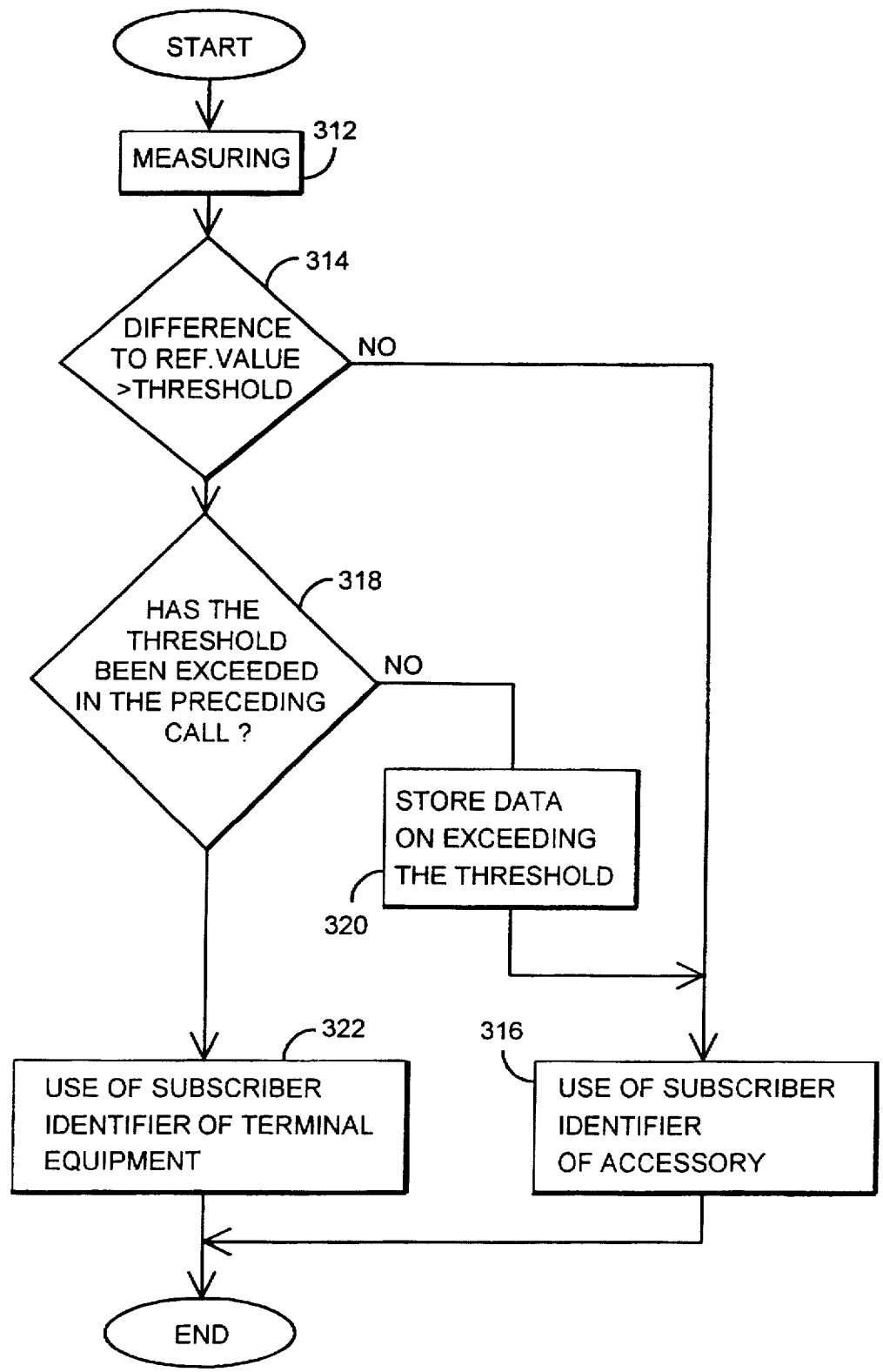

In one preferred embodiment of the method according to the invention, lightened checking made in connection with call establishment can be carried out for example according to the flow chart of FIG. 3a in the following way. First in step 300 a location describing parameter, such as a TA parameter, is measured from the signal of the base station via which the initiated call is being made. In step 302 the measured value is compared to a predetermined parameter of this base station stored into the memory. If the value of the parameter does not differ from the stored reference value more than a preset threshold value, the call can be established by using the subscriber identifier of the accessory, the calls made with which can be cheaper than the calls made with the subscriber identifier of the terminal equipment, for example.

If the difference is greater than the set threshold, a corresponding location describing parameter is measured from some other surrounding base station in step 306 and it is compared to a corresponding stored reference value in step 308. If the difference is smaller than the set threshold, the call can be made as in step 302 with the identifier of the accessory. If this difference, too, is greater than the threshold, the call is established by using the subscriber identifier of the terminal equipment in step 310.

The method described above can be modified as desired. Steps 306 and 308 can be left out and a call can be established immediately by using the subscriber identifier of the terminal equipment in step 310.

On the other hand, steps 306 and 308 can be repeated a desired number of times by using several base stations. There are several reasons for making new measurements when the first measurement shows that the accessory has been transferred from its allowed location measured at the installation stage. The configuration of the cellular radio system may have changed. The location of some base station may have been changed by a network operator, or a new base station may have been added to the environment of the accessory, whereby the location determination made by the accessory at the installation stage is no longer correct with respect to the surrounding base stations. In that case the location can be found to be the same as previously by means of several measurements. The possibility of measuring errors should also be taken into account.

A second preferred embodiment of the method according to the invention is illustrated in flow chart 3b. First, as above, in step 312 a location describing parameter is measured from the signal of the base station via which the initiated call is being made. In step 314 the measured value is compared to the parameter of this base station stored into the memory. If the value of the parameter does not differ from the stored reference value more than a preset threshold value, the call can be established by using the subscriber identifier of the accessory in step 316.

In case the difference is greater than the set threshold, it is checked in step 318 if the threshold has been exceeded in a previous call. If this is not the case, data on exceeding the threshold is stored into the memory in step 320 and the call is established by using the subscriber identifier of the accessory in step 316. In case the threshold has already been exceeded in the preceding call, the call is established by using subscriber identifier of the terminal equipment in step 322.

The above described process alternative allows the user to make one call by using the subscriber identifier of the accessory even if the measuring shows that the equipment has been transferred. After the call the equipment could make a more exact location determination for example with the same method as at the installation stage. Furthermore, if it is found out that the location has changed, the use of the accessory would be obstructed. If a more exact measuring shows that the network configuration, for example, has changed, the data on exceeding the threshold would be set to zero in the memory element and the reference values set in the memory would be updated in order that the threshold would not be subsequently exceeded.

It is also possible that the equipment has to be transferred for example when moving, whereby location determination made at the installation stage is incorrect. Similarly, as already mentioned before, the changing of network configuration can produce an apparent incorrectness in location determination. In order to solve this problem, the location parameters stored into the memory of the equipment can be emptied in the solution of the invention by means of controlling from the cellular radio system. In that case, when the terminal equipment is next connected to the accessory, location determination at the installation stage is made again. Emptying of the stored data has to be controlled by the operator via the system so that there is no possibility for misuse. Controlling can be realized by signalling commands, for example.

In the solution according to the invention when the accessory connects to the subscriber terminal equipment, the accessory reads at least some of the subscriber data of the terminal equipment into its memory register. Subscriber data can be utilized in various ways. The accessory may allow calls only for a specific restricted set of terminal equipments which are identified on the basis of subscriber data. On the other hand, the data can also be transmitted to the network operator by a specific message, whereby the operator may arrange charging as desired, for example. In this way a kind of public telephone solution can be accomplished.

Figure 2:
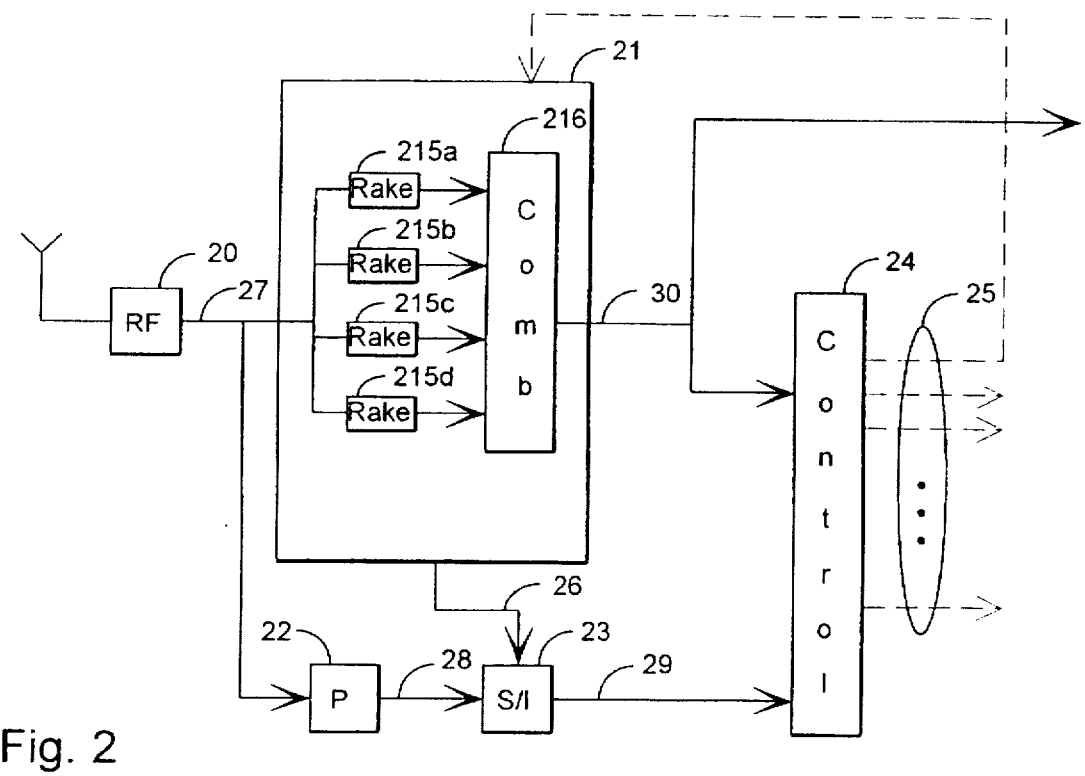
FIG. 2 illustrates an example of the structure of the combination of the accessory according to the invention and a mobile phone by means of a block diagram.

In the following, an example of the structure of the combination of the accessory according to the invention and the terminal equipment is viewed by means of the flow diagram of FIG. 2. In the figure a subscriber terminal equipment 204 is connected to an accessory 214 by a bus 216. The bus 216 can be serial or parallel, or a combination of these. The accessory comprises a serial bus buffer 206 connected to the bus 216. The accessory according to the invention comprises means 202, 210 for maintaining a specified subscriber identifier differing from the subscriber identifier of the subscriber terminal equipment. For example in the case of the GSM system, subscriber data is typically stored into a SIM card. In the accessory according to the invention, the means 202 comprise a reader of the SIM card capable of reading the necessary subscriber data from the card. The subscriber data can be further stored into other memory means 210 of the equipment.

The combination of the accessory and the terminal equipment further comprises means (200, 210, 204) for determining the location of the combination in connection with activation, typically by using a signal transmitted by two or more base stations with methods described above. The accessory 214 typically comprises a control processor 200 that controls the operation of the equipment, a memory element 210 which is connected to the control processor 200 and to which programs or data, such as subscriber data, threshold values and corresponding base station data can be stored. By means of the data stored into the memory element, the control processor 200 can control the use of the accessory in various ways, such as restrict its use for a desired set of subscriber identifiers of terminal equipments. By means of the control processor 200 and the memory means 210 the combination of the accessory and the terminal equipment checks its location whenever a call is established and also compares the measuring results to the reference values stored into the memory element and obstructs or allows the use of the stored subscriber identifier in the means 202, 210 during the call as described above.

In the preferred embodiment of the invention, all communication with the cellular system takes place by using an accessory 204 for setting up a connection and for transmitting a signal. In a second embodiment the accessory comprises radio frequency parts 208 connected to the control processor 200 by means of which parts the accessory can communicate with the base station but only when the terminal equipment 204 is connected to it. The radio frequency parts 208 are as such similar to the radio frequency parts in the terminal equipment.

In a second embodiment of the invention, the accessory may also comprise adaptor means 212 connected to the control processor 200, by means of which an ordinary telephone using a two-wire connection can be connected to the accessory. The adaptor 212 typically comprises a two/four-wire transformer, a line voltage generator and a dual tone multifrequency and pulse dialling identifier. An audio line 218 can be connected directly from the adapter 212 to the terminal equipment 204. Adaptor means are described in more detail in FI 941714.

The accessory 214 according to the invention may comprise other structural parts typical for telephones, as is evident for those skilled in the art, but calls cannot be established independently with it without the terminal equipment 204 connected thereto.

Although the invention has been above described with reference to the example of the accompanying drawings, it is obvious that the invention is not restricted thereto, but it can be modified in various ways within the scope of the inventive idea disclosed in the appended claims.

We claim:

1. A method for controlling an accessory of a location data maintaining subscriber terminal equipment of a cellular network, said cellular network comprises one or more base stations in each cell, and said accessory comprises a specified subscriber identifier differing from the identifier of the subscriber terminal equipment within the network, the method comprising the steps of:

connecting the accessory to the subscriber terminal equipment when the accessory is activated for location determination, the combination of the terminal equipment and the accessory determining its location by communicating with one or more base stations and storing the location data into a memory register, whenever a call is being established when the subscriber terminal equipment is connected to the accessory, said combination checking its location by communicating with one or more base stations, comparing its location at that moment with the location in the memory register, and in case the locations differ from one another more than a preset threshold value, obstructing the use of the subscriber identifier of the accessory during the call, and enabling use of the subscriber identifier of the terminal equipment.

2. A method according to claim 1, wherein when the accessory is connected to the subscriber terminal equipment, the accessory reads at least some of the subscriber data in the terminal equipment into its memory register.

3. A method according to claim 1, wherein the accessory allows calls only for a specific restricted set of terminal equipments which are identified on the basis of subscriber data.

4. A method according to claim 1, wherein location determination takes place by means of signalling between one or several base stations and the combination of the terminal equipment and the accessory.

5. A method according to claim 4, wherein location determination employs the propagation delay of a signal between the terminal equipment and the base stations and the identification data transmitted by each base station.

6. A method according to claim 1, wherein the subscriber identifier of the accessory is stored into a SIM card.

7. A method according to claim 1, wherein the subscriber identifier of the equipment is stored into a memory element of each equipment.

8. A method according to claim 1, wherein the data on the subscriber identifiers of both the accessory and the terminal equipment is transmitted to the base station.

9. A method for controlling an accessory of a location maintaining data subscriber terminal equipment of a cellular network, said cellular network comprises one or more base stations in each cell, and said accessory comprises a specified subscriber identifier differing from the identifier of the subscriber terminal equipment within the network, the method comprising the steps of:

connecting the accessory to the subscriber terminal equipment when the accessory is activated for location determination, the combination of the terminal equipment and the accessory determining its location by communicating with one or more base stations and storing the location data into a memory register, whenever a call is being established when the subscriber terminal equipment is connected to the accessory, said combination checking its location by communicating with one or more base stations, comparing its location at that moment with the location in the memory register, and in case the locations differ from one another more than a preset threshold value, obstructing the use of the subscriber identifier of the accessory during the calls subsequent to the established call, and enabling use of the subscriber identifier of the terminal equipment.

10. A method for controlling an accessory of a location data maintaining subscriber terminal equipment of a cellular network, said cellular network comprises one or more base stations in each cell, and said accessory comprises a specified subscriber identifier differing from the identifier of the subscriber terminal equipment, the method comprising the steps of:

connecting the accessory to the subscriber terminal equipment when the accessory is activated for location determination, the combination of the terminal equipment and the accessory determining its location by communicating with one or more base stations and storing the location data into a memory register, emptying the memory register, into which the data on the location of the accessory is stored, on the basis of controlling from the cellular network.

11. An accessory of a subscriber terminal equipment of a cellular network, said cellular network comprises one or more base stations in each cell, and said accessory comprises means for maintaining a specified subscriber identifier differing from the identifier of the subscriber terminal equipment, and means for connecting to the terminal equipment, wherein the combination of the terminal equipment and the accessory further comprises:

means for determining its location upon activation of said accessory, means for storing location parameters, means for checking its location whenever a call is established when the terminal equipment is connected to the accessory, means for comparing the checked location with the stored location data, and means for obstructing the use of the subscriber identifier during the call in case the location data differ from one another more than the preset threshold value, and means for enabling use of the subscriber identifier of the terminal equipment.

12. An accessory according to claim 11, wherein the accessory further comprises means for reading at least some of the subscriber data into a memory means.

13. An accessory according to claim 11, wherein the accessory further comprises means for maintaining data on a set of subscriber identifiers of the terminal equipments, and the combination of the terminal equipment and the accessory comprises means for enabling calls only with such ones of the terminal equipments using said identifiers.

14. An accessory according to claim 11, wherein the accessory further comprises separate radio frequency parts.

15. An accessory according to claim 11, wherein the accessory further comprises an adaptor by means of which an ordinary fixed network telephone can be connected to the accessory.

16. An accessory according to claim 11, wherein the means for maintaining a specified subscriber identifier comprises a SIM card reading device.

* * * * *